US005726922A

United States Patent [19]
Womble et al.

[11] Patent Number: 5,726,922
[45] Date of Patent: Mar. 10, 1998

[54] ASSEMBLY FOR REMOVABLY CONNECTING DATA STORAGE DEVICES

[75] Inventors: J. Scott Womble, West Palm Beach; Francis A. Kuchar, Jr., Delray Beach; John R. Dewitt; Jay H. Neer, both of Boca Raton, all of Fla.

[73] Assignee: International Business Machines Corp., Armonk, N.Y.

[21] Appl. No.: 659,960

[22] Filed: Jun. 7, 1996

Related U.S. Application Data

[63] Continuation of Ser. No. 177,117, Jan. 3, 1994, abandoned.

[51] Int. Cl.$^6$ .............................. G06F 1/16; H01R 13/64
[52] U.S. Cl. ...................... 364/708.1; 439/377; 439/374; 361/726
[58] Field of Search .......................... 364/478.01, 707, 364/708.1; 439/296–298, 374, 377, 717, 928.1; 369/75.1; 361/683, 684, 685, 724–727, 732, 736, 740, 747, 759, 786, 801; 312/111

[56] References Cited

U.S. PATENT DOCUMENTS

| | | |
|---|---|---|
| Re. 34,369 | 9/1993 | Darden et al. . |
| 3,846,576 | 11/1974 | Silbermann . |
| 4,189,201 | 2/1980 | Romania . |
| 4,272,141 | 6/1981 | McKeen et al. . |
| 4,553,000 | 11/1985 | Appleton . |
| 4,639,863 | 1/1987 | Harrison et al. . |
| 4,704,599 | 11/1987 | Kimmel et al. . |
| 4,718,858 | 1/1988 | Godfrey et al. . |
| 4,776,803 | 10/1988 | Pretchel et al. . |
| 4,794,490 | 12/1988 | Epstein . |
| 4,811,275 | 3/1989 | Balogh, Jr. et al. . |
| 4,834,665 | 5/1989 | Kreinberg et al. . |
| 4,846,699 | 7/1989 | Glover et al. . |
| 4,863,395 | 9/1989 | Babuka et al. . |
| 4,936,790 | 6/1990 | De La Cruz . |
| 4,937,806 | 6/1990 | Babson et al. . |
| 4,941,841 | 7/1990 | Darden et al. . |
| 4,959,021 | 9/1990 | Byrne . |
| 4,960,384 | 10/1990 | Singer et al. . |
| 4,969,838 | 11/1990 | Himes, Jr. et al. . |
| 4,996,628 | 2/1991 | Harvey et al. . |
| 5,007,846 | 4/1991 | Ravid . |
| 5,024,627 | 6/1991 | Bennett et al. . |
| 5,030,108 | 7/1991 | Babow et al. . |
| 5,033,049 | 7/1991 | Keener et al. . |
| 5,038,239 | 8/1991 | Vettel et al. . |
| 5,062,016 | 10/1991 | Zupancic . |
| 5,067,606 | 11/1991 | Schlatter et al. . |
| 5,086,372 | 2/1992 | Bennett et al. . |
| 5,097,439 | 3/1992 | Patriquin et al. . |
| 5,099,137 | 3/1992 | Lattin, Jr. . |
| 5,103,378 | 4/1992 | Stowers et al. . |
| 5,113,317 | 5/1992 | Howe . |
| 5,126,890 | 6/1992 | Wade et al. . |
| 5,136,146 | 8/1992 | Anglin et al. . |
| 5,169,332 | 12/1992 | Cooke et al. . |
| 5,184,961 | 2/1993 | Ramirez et al. . |
| 5,190,465 | 3/1993 | Davidge et al. . |
| 5,195,022 | 3/1993 | Hoppal et al. . |
| 5,210,855 | 5/1993 | Bartol . |
| 5,211,459 | 5/1993 | Wu . |
| 5,220,815 | 6/1993 | Davidge et al. . |

(List continued on next page.)

*Primary Examiner*—Reba I. Elmore
*Assistant Examiner*—Thomas E. Brown
*Attorney, Agent, or Firm*—Haynes and Boone, L.L.P.

[57] ABSTRACT

An assembly for removably connecting data storage devices is provided for coupling a plurality of such devices within a computer or file server. The assembly comprises a plurality of trays each having a data storage device and a first electrical connector mounted thereto. Each tray contains an adapter assembly, having a second electrical connector, for consolidating the plurality of signals between the computer and the device. The trays are removably inserted within a housing having a plurality of printed circuit boards for connecting to the first electrical connectors of the inserted trays. A plurality of locking and actuating assemblies mounted within the housing govern insertion and removal of the trays into and out of the housing and passage of signals between the electrical connectors.

19 Claims, 5 Drawing Sheets

U.S. PATENT DOCUMENTS

| | | |
|---|---|---|
| 5,227,957 | 7/1993 | Deters . |
| 5,233,594 | 8/1993 | Wilhelm . |
| 5,233,692 | 8/1993 | Gajjar et al. . |
| 5,239,445 | 8/1993 | Parks et al. . |
| 5,239,632 | 8/1993 | Larner . |
| 5,239,640 | 8/1993 | Froemke et al. . |
| 5,242,314 | 9/1993 | Di Giulio et al. . |
| 5,245,258 | 9/1993 | Becker et al. . |
| 5,245,558 | 9/1993 | Hachey . |

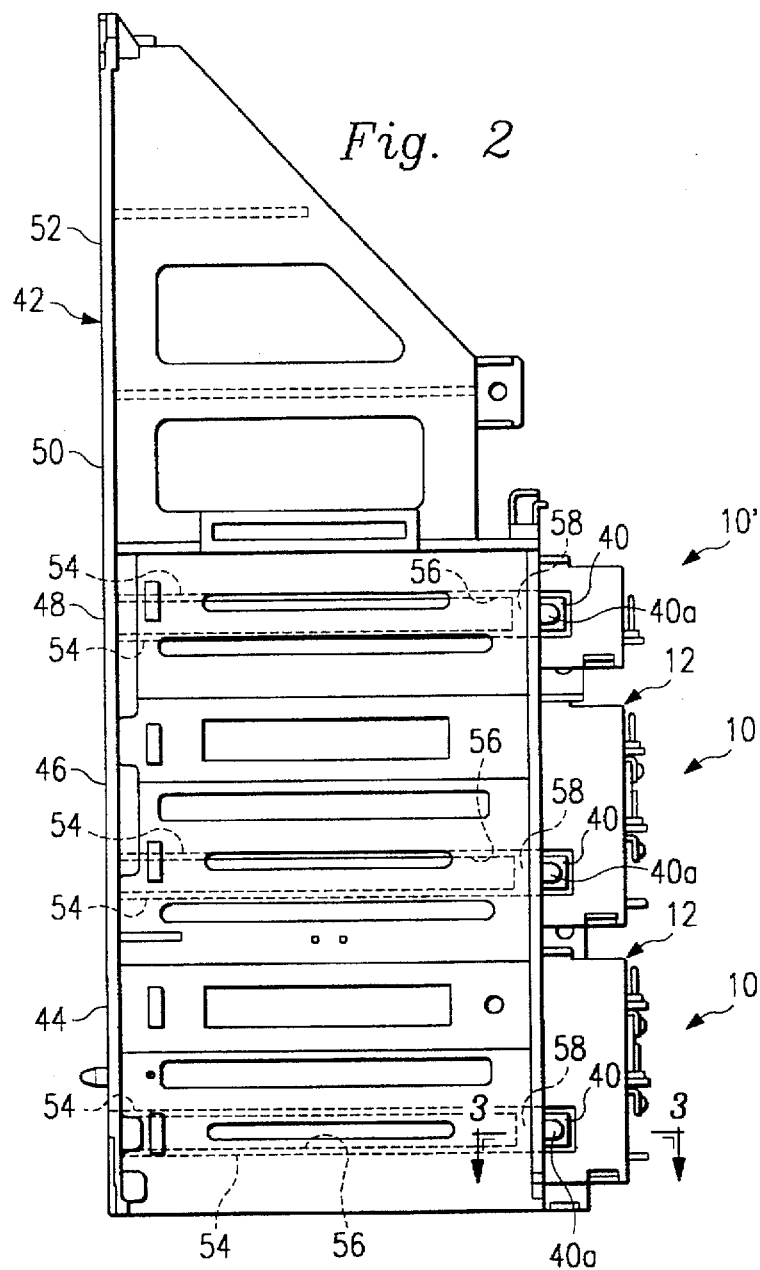
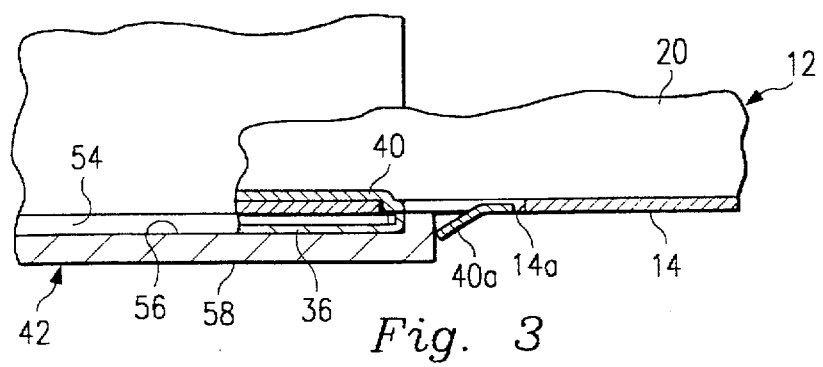

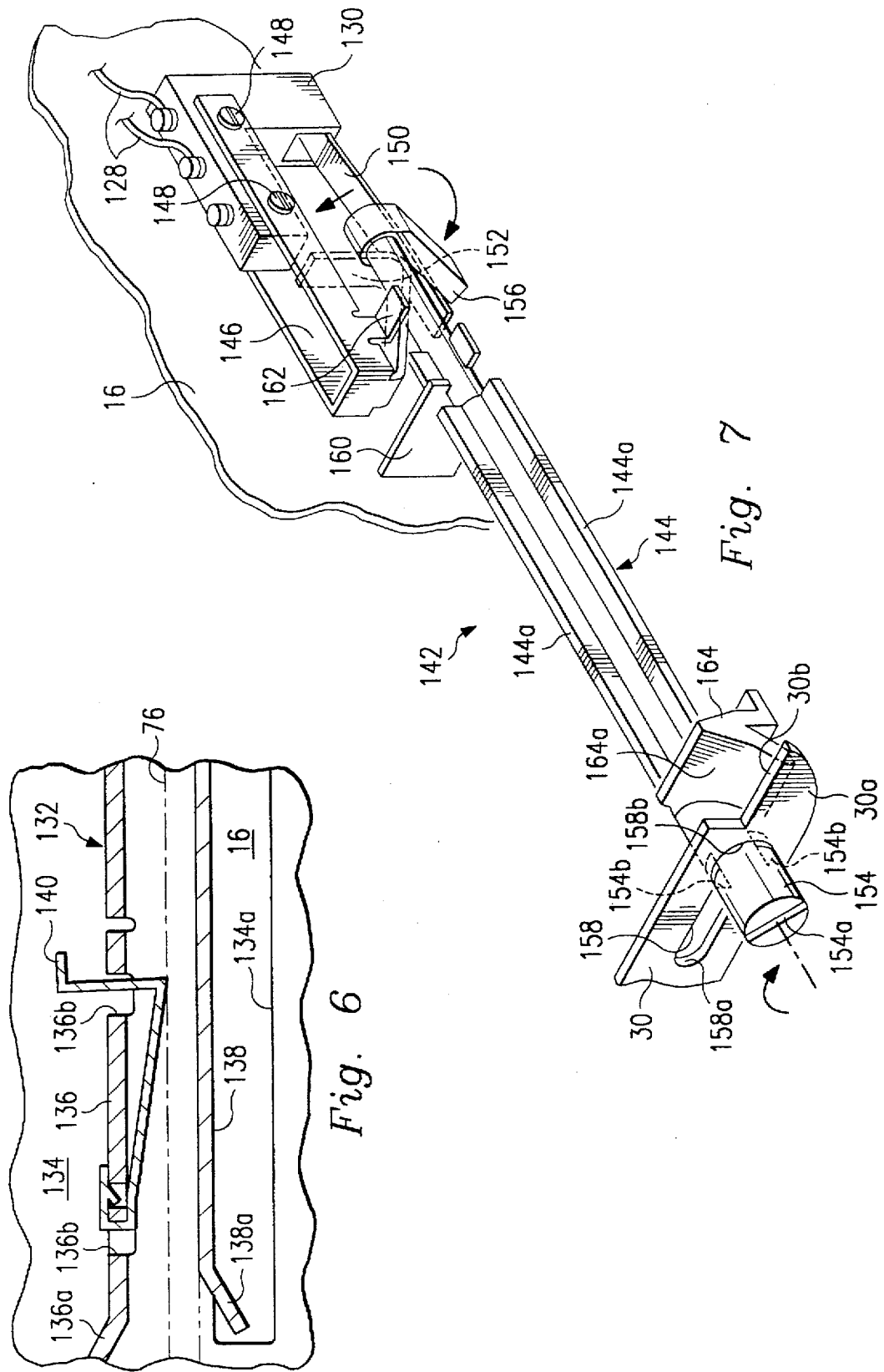

ASSEMBLY FOR REMOVABLY CONNECTING DATA STORAGE DEVICES

This is a continuation of application Ser. No. 08/177,117 filed on Jan. 3, 1994, now abandoned.

TECHNICAL FIELD

The present invention relates generally to computer buses and assemblies for receiving data storage devices, and specifically, to an assembly for removably connecting data storage devices in a rapid and reliable manner without having to power down the computer system or file server, namely in the "hot plugging" mode.

BACKGROUND OF THE INVENTION

Over the last decade, the demand for availability, capacity, performance, reliability and security of data storage devices has increased substantially due to the public's increased reliance on computers. In response to this demand, companies have introduced various data storage devices with removable media. While these removable media storage devices enable the user to enjoy practically unlimited storage capacity and greater security, removable media storage devices have failed to meet the public's demand for reliability, availability and performance. For the most part, these failures can be attributed to the inherent problems of the removable media design, such as the chronic misalignment of read/write heads and continued exposure of the media and heads to dust.

More recently, as technology advanced, the price of sealed disk drives has plummeted to the point that it is only slightly above the cost of the removable media. Recognizing this cost reduction and the chronic misalignment and dust problems of removable media storage devices, many computer and mass storage manufacturers have directed their research and development toward the construction and operation of assemblies containing one or more individually removable sealed disk drives in an effort to replace removable media storage devices and improve the reliability, availability and performance of data storage devices.

The shift to sealed disk drives has not only successfully eliminated the concern over the removable media storage device problems of dust and misalignment, it also has provided other benefits as well. First, a defective sealed disk drive can be replaced by a new disk drive, thereby increasing the availability of the computer. Such replacement eliminates all sources of defect including those in the drive mechanism and disk controller because the entire disk drive is replaced, not just the media. Second, the storage capacity and the performance of the computer can be enhanced by adding additional sealed disk drives to the assembly in a daisy-chained manner. The performance of the computer is improved by conducting concurrent read and write operations in multiple smaller drives, instead of successive write and read operations in a larger drive. In addition, unlike the user of removable media storage devices, the user of sealed disk drives has instant access to information on any of the drives, without having to change the media in the storage device. This is especially helpful in a large computing environment where the user is far from the location of the storage device. Further, disk drives containing sensitive information can be individually removed from the assembly and stored in a safe place without subjecting them to the head misalignment and dust problems of the removable media drives.

Although these benefits sound very appealing, sealed data storage device assemblies still fall short of establishing rapid and reliable connection and disconnection of disk drives to the computer. Their deficiencies can be grouped into two broad areas. The first area involves the lack of preventive features against user errors, and the second area involves oversights in design and lack of versatility.

Various data storage device assemblies are known in the art, however, none of them offer a complete solution in preventing user errors. As a result, many computers are repeatedly rendered inoperable. For example, many earlier designs required the user to manually connect power and SCSI (Small Computer System Interface) ribbon cables between sealed disk drives stacked one above the other. While such method of connection is adequate for situations where the disk drives are permanently installed in the computer, it is not where ease in the replacement of drives is desired. An untrained user simply does not know what, when and where to pull, or the exact steps and sequence in connecting and disconnecting disk drives. If an user mistakenly pulls the wrong power or SCSI cable, he could damage the disk drive, resulting in the loss of data. Similarly, if a user pulls on the SCSI wires rather than on the SCSI connectors themselves, the excessive stress placed on the cable wires may cause them to break away from the connector pins creating an intermittent or permanent open circuit.

Another user error deficiency of the prior art involves the manual selection of SCSI addresses and the manual termination of SCSI daisy-chains. Under the SCSI standard, each disk drive's address must be uniquely set between 0 and 7 to avoid SCSI address conflicts. In addition, the last disk drive in the SCSI daisy-chain must be terminated using resistor packs. Therefore, if a user wants to add a new drive to a prior art assembly, another daisy-chain cable has to be connected between the existing last drive and the new drive; the terminating resistors have to be moved from the existing last drive to the new drive; and the SCSI address pins on the controller of the new drive must be set to a unique address in the new drive. These steps are both time consuming and susceptible to user errors, especially as the configuration of SCSI address pins on the disk drive controller varies among manufacturers.

Another user error deficiency of the prior art is the lack of a mechanism to prevent either the unintentional or negligent removal of an energized disk drive or the premature powering of a disk drive that has not been fully inserted. Without such a mechanism, many drives are likely to suffer data loss and power spike damages.

In addition to the failure of the prior art to prevent user errors, prior art sealed disk drive assemblies fail in facilitating rapid and reliable connection and disconnection of the drives. For example, in the prior art, multiple pins and socket connectors are used to connect a disk drive to the computer. Such couplings pose numerous problems. First, a large amount of force is generally required to insert the male connector into the female connector. Second, insertion of the male connector into the female connector frequently requires side-to-side movement of the disk drive, which is practically impossible within the tight confines of such assemblies. Third, bending and wear of the pins is common. These problems are further complicated by the imprecise alignment of the disk drives to the connectors in such assemblies. Further, prior art assemblies require two different SCSI cables in order to accommodate disk drives with 50-position SCSI Fast and 68-position SCSI Wide connectors.

What is needed is an assembly for removably connecting data storage devices in a rapid and reliable manner without having to power down the computer system or file server and that remedies the above-noted problems.

SUMMARY OF THE INVENTION

The foregoing problems are solved and a technical advance is achieved by an assembly for removably connecting data storage devices that enables rapid and reliable replacement of storage devices without having to power down the computer system or file server. In a departure from the art, a consolidation adapter assembly is fixed to a drive to consolidate power, SCSI data and control signals and SCSI address selection signals into a single edge connector for facilitating connection of the drive to a computer system or file server. In a further departure from the art, a tray for holding the drive and consolidation adapter assembly is received in a housing having a locking and actuating assembly for preventing insertion or removal of the drive before the power connection to the drive is disconnected.

In an illustrative embodiment, the assembly comprises a housing for receiving a plurality of data storage device trays containing data storage devices, such as a SCSI drive, tape drive, compact disk drive, optical drive or other similar device. Each device has a plurality of electrical connectors for passage of various signals such as power and SCSI data and control signals, and a consolidation adapter assembly is disposed between each device and the back wall of its tray for passing these signals to the operating system. The adapter assembly comprises a printed circuit board adapter card screw mounted to the tray and various electrical connectors for receiving the signals from the device. The consolidation adapter assembly further comprises an 80-position female edge connector extending rearwardly through a rectangular slot in the back wall of the tray to provide a unitary connector for passing the signals between the device and the assembly.

The assembly further comprises a plurality of horizontally disposed adapter cards screw mounted within the rearward end of the housing. Each of the cards comprises a printed circuit board having an 80-position male edge connector for engagement with the edge connector of the consolidation adapter assembly, and a 50-position male edge connector extending outwardly from the housing for connecting the assembly to the operating system. Once installed in the housing, the devices are interconnected via a SCSI daisy-chain cable as is known in the art. A power connector is also disposed on each of the cards for receiving power. This power, prior to being passed through the edge connectors, is routed through a microswitch terminal and then a spike preventing power leveling circuit disposed on each of the cards. Each terminal is connected to a respective microswitch which controls the flow of power between the cards and the devices.

A plurality of corresponding pairs of guide rails extend horizontally within the housing for receiving flanges extending from each of the trays. Locking and actuating assemblies are disposed adjacent the guide rails for governing the insertion and removal of the trays into and out of the housing, as well as the passage of power to the devices from the cards. Each locking and actuating assembly comprises the microswitch and an actuating shaft. The microswitch is screw mounted within a mounting harness and includes an actuating trigger movable between POWER ON and POWER OFF positions. The shaft is generally cylindrical and comprises a manually engageable head at one end and a lever engaging the trigger at the other end. The shaft extends horizontally through a generally oblong slot formed in the housing, leaving the head exposed. The slot is not perfectly oblong but is comprised of an oblong portion and an enlarged circular portion. The cylindrical head of the shaft is freely rotatable within the circular portion, but the diameter of the head is too large for freely entering the oblong portion. Diametrically opposed grooves, however, are cut into the shaft for enabling the head of the shaft to freely enter the oblong portion once the shaft is rotated to a particular alignment, preferably, a one-eighth clockwise turn.

A generally rectangular body extends from the shaft and when the microswitch is in its POWER ON position, the body blocks the entrance to the guide rails, thereby preventing installation of a tray. Therefore, the head of the shaft must be manually engaged and rotated clockwise to rotate the body away from the entrance to the guide rails. As the shaft is rotated, the lever pushes upwardly on the trigger to switch the microswitch to the POWER OFF position. The microswitch thus causes a break in the power circuit, preventing power from reaching the edge connector, making it safe to install the device within the housing. To power up the device, the head of the shaft is again engaged, to rotate the shaft counterclockwise to disengage the trigger and switch the microswitch to its POWER ON position.

The invention results in several technical advantages. Generally, the invention enables rapid and reliable replacement of storage devices in an assembly containing multiple devices without having to power down the computer system or file server. Specifically, an important technical advantage achieved with the invention is that it eliminates the need to manually disconnect and connect numerous connectors from the computer when replacing a device by consolidating power, SCSI data and control signals and SCSI address selection signals into a single connector.

An additional technical advantage achieved with the invention is that an edge card connector is used in connecting the device to the computer system preventing shorting and bending problems of prior art pin and socket connectors.

An additional technical advantage achieved with the invention is the pre-assignment of a SCSI address to each device in the assembly, thereby ensuring that each device will have a unique SCSI address and avoiding SCSI address conflict.

An additional technical advantage achieved with the invention is the pre-termination of the SCSI daisy-chain ensuring that the last device in the SCSI daisy-chain is terminated.

An additional technical advantage achieved with the invention is that an energized device is prevented from being removed unless the power connection to the device is first disconnected.

An additional technical advantage achieved with the invention is that power will not be applied to a device unless it is fully inserted and locked in the assembly.

An additional technical advantage achieved with the invention is the constant electrical grounding of the drives through the assembly chassis.

An additional technical advantage achieved with the invention is the ability for it to snap into the frame work of existing server systems without requiring any additional hardware.

An additional technical advantage achieved with the invention is the modularity of the assembly enabling field upgradeability of existing systems and easy repair once in place.

An additional technical advantage achieved with the invention is that no additional depth is required by the pull handle due to its flexibility.

BRIEF DESCRIPTION OF THE DRAWINGS

FIG. 2 is an elevational view of the invention shown in FIG. 1 installed in a chassis;

FIG. 3 is an enlarged, partial cross-sectional view taken along the line 3—3 of FIG. 2;

FIG. 6 is an enlarged, partial cross-sectional view taken along the line 6—6 of FIG. 1;

FIG. 7 is an enlarged perspective view of the locking and actuating assembly;

DESCRIPTION OF THE ILLUSTRATIVE EMBODIMENTS

Figure 1:
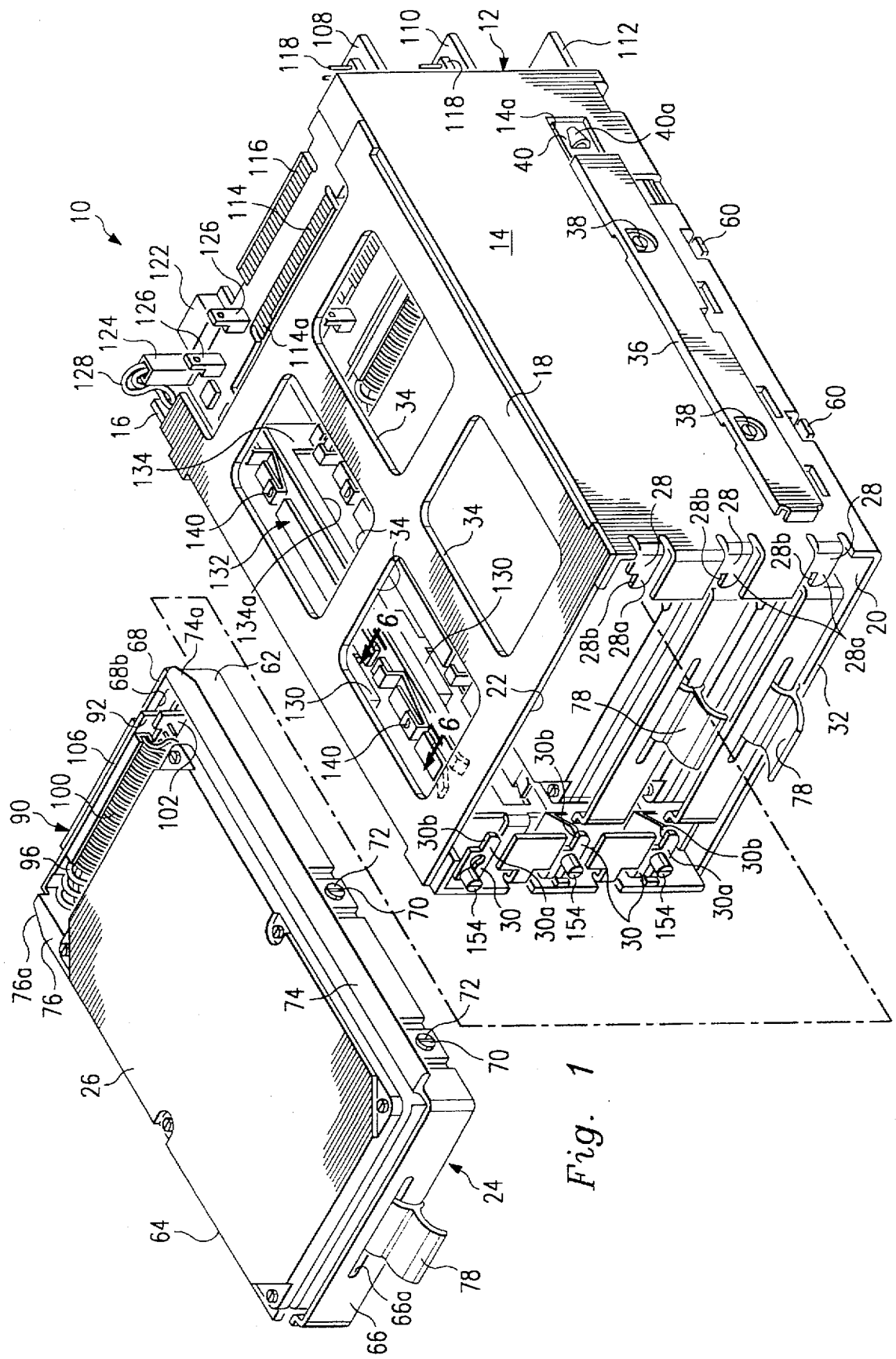
FIG. 1 is a partially exploded, perspective view of the present preferred embodiment of the present invention.

In FIG. 1, the reference numeral 10 designates a data storage device assembly embodying features of the present invention for use in connection with a computer system or file server (not shown). It is understood that an appropriate operating system must be installed in the computer to enable hot plugging of data storage devices. The assembly 10 comprises a housing 12 having sidewalls 14 and 16, a top 18 and a bottom 20 defining a chamber 22 for receiving a plurality of data storage device trays 24 containing data storage devices 26, such as a SCSI drive, tape drive, compact disk drive, optical drive or other similar device. A plurality of arms 28 and 30 having fingers 28a and 30a defining guiding edges 28b and 30b, respectively, extend inwardly from the sidewalls 14 and 16 and define a front entrance 32 to the housing 12. A plurality of ventilation holes 34 are formed in the top 18 and the bottom 20 (not shown) of the housing 12 to allow cooling of the devices 26 during operation. The housing 12 is conventionally formed of sheet metal with the sidewalls 14 and 16, the top 18, the bottom 20 and the arms 28 and 30 formed as a single piece or joined together in a conventional manner.

Horizontally extending guide rails 36 (one of which is not shown) are mounted to the exterior surfaces of the sidewalls 14 and 16, respectively, by screws 38, for purposes described below. Formed through the sidewall 14 adjacent the rear end of the guide rail 36 is a rectangular opening 14a for receiving a spring lock 40 fixed to the interior surface of the sidewall 14 (see FIG. 3) and having a semi-conical protuberance 40a extending outwardly through the opening 14a. Force applied to the protuberance 40a during insertion and removal of the assembly 10 urges the spring lock 40 to recess inwardly into the chamber 22, thereby causing the protuberance 40a to be flush with the sidewall 14.

Referring now to FIG. 2, the guide rails 36 and the spring lock 40 engage corresponding structures in a conventional computer or file server chassis 42 for removably securing the assembly 10 within the chassis 42. More specifically, the chassis 42 defines numerous compartments, such as those designated by reference numerals 44, 46, 48, 50 and 52, for receiving various data storage devices such as SCSI drives, floppy drives, tape drives, compact disk drives, optical drives and other similar devices. Typically, the compartments disposed near the top of the chassis 42, namely compartments 50 and 52, are designed to receive permanently mounted devices, and the lower compartments, namely compartments 44, 46 and 48, are designed to receive either full-height Winchester drives (compartments 44 and 46) or half-height Winchester drives (compartment 48).

Moreover, conventional chassis like the chassis 42 contain inwardly extending ridges, such as the ridges 54 indicated by the broken lines in FIG. 2, that define channels 56 extending horizontally along the length of the compartments 44, 46 and 48, respectively. The channels 56 are typically rearwardly capped by end caps such as the caps 58, also shown in broken lines. In a preferred embodiment of the present invention, the rails 36 of the assembly 10 are dimensioned to be received within the channels 56 of the chassis 42 thereby allowing the assembly 10 to be inserted into a compartment, such as the compartment 44, of the chassis 42.

As shown in FIG. 2, the assembly 10 is dimensioned to be received in a full-height bay, such as either the compartment 44 or the compartment 46. In such an embodiment and as shown in FIG. 1, the housing 12 can easily fit three of the devices 26 and their associated trays 24 where the devices 26 are standard one inch high, 3.5 inch hard drives or similar devices, it being understood that the housing 12, when dimensioned to be received in a full-height bay, can alternatively fit two standard one-half inch high 3.5 inch hard drives or four standard one-quarter inch high, 3.5 inch hard drives. The assembly 10 can also be dimensioned to be received in a half-height bay, such as the compartment 48 as shown in FIG. 2 and referred to by reference numeral 10'. In such an embodiment, the housing 12 preferably only receives one standard 3.5 inch hard drive as the device 26.

In a preferred embodiment, the assembly 10 is dimensioned as shown in FIG. 1 to accommodate three of the devices 26 and their associated trays 24, and thus, the following description of the present invention will be tailored to same, although for the ease of presentation, descriptions of duplicative components of the various devices 26 may be deleted and referred to in the singular.

Referring to FIG. 3, the spring lock 40 acts to removably lock the assembly 10 within the chassis 42 once inserted by capturing the cap 58 of the chassis 42 between the protuberance 40a of the spring lock 40 and the rail 36 secured to the sidewall 14. The protuberance 40a is manually engageable by a force as described above to allow the cap 58 to pass over the protuberance 40a during insertion as well as to unlock the assembly 10 enabling its removal from the chassis 42 once installed. Referring back to FIG. 1, a plurality of mounting holes 60 are disposed in the sidewalls 14 and 16 and the bottom 20 of the housing 12 for receiving conventional locking mechanisms (not shown) to secure the assembly 10 within a computer or file server chassis lacking the channels 56.

Still referring to FIG. 1, the tray 24 includes sidewalls 62 and 64, a front wall 66 and a back wall 68 that together define a rectangular void for receiving the device 26. Mounting holes 70 (two of which are shown) extend through the sidewalls 62 and 64 for receiving screws 72 used to secure the device 26 within the tray 24 by threadably engaging same within corresponding mounting holes (not shown) in the device 26. It is understood that because different manufacturers of the devices 26 place their mounting holes in different locations, additional mounting holes, or an elongated slot, can be provided in the sidewalls 62 and 64 to assure alignment between the mounting holes of the tray 24 and the device 26, regardless of its manufacturer.

Flanges 74 and 76, having tapered rearward ends 74a and 76a, extend outwardly from and horizontally along the sidewalls 62 and 64 of the tray 24 for removably inserting the tray 24 within the housing 12 by engaging corresponding structures within the housing 12 described below. A pull tab 78, preferably comprised of a flexible dielectric material such as Amp Incorporated's P/N 88450-8 or DuPont Electronic's P/N 66147-008, is wrapped around a slit 66a in the front wall 66 of the tray 24 to provide a manually engageable tab by which to grasp the tray 24 to facilitate removal of the tray 24 from the housing 12. It is understood that for devices requiring a frontal opening to insert media, the front wall 66 of the tray 24 can either be removed or modified, so that the frontal opening of the device 26 is not obstructed.

Figure 4:
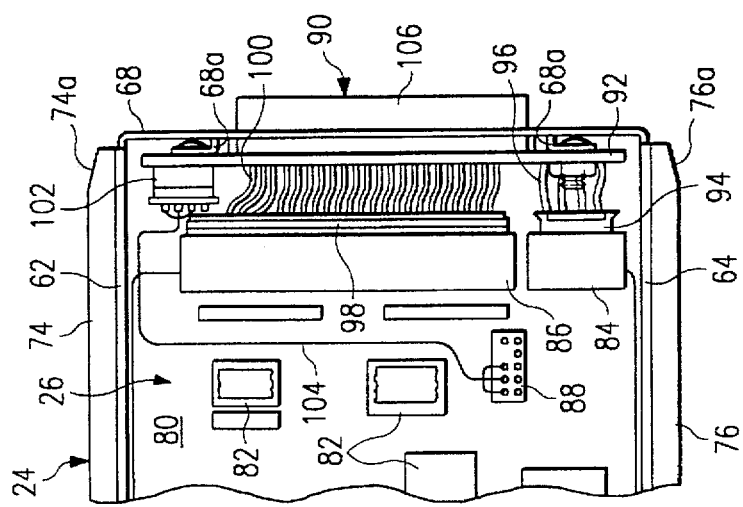
FIG. 4 is a bottom plan view showing a portion of the data storage device, the data storage device tray and the consolidation adapter assembly.

Referring to FIG. 4, the underside of the device 26 comprises a disk controller 80 having numerous components 82 for controlling the operation of the device 26. Data storage devices such as the device 26 typically have a plurality of electrical connectors extending from the disk controller 80 for passing various signals such as power and SCSI data and control signals. In a preferred embodiment, the device 26 has a power connector 84 and a 50-position SCSI Fast connector 86 extending from the disk controller, as well as a SCSI address terminal 88.

A consolidation adapter assembly 90 is disposed between the device 26 and the back wall 68 of the tray 24 for interconnecting the connectors 84, 86 and 88 of the device 26 to the computer system (not shown) in which the device 26 is operating. The adapter assembly 90 comprises a printed circuit board adapter card 92 screw mounted to the tray 24 via mounting tabs 68a formed in the back wall 68. The power connector 84 is electrically connected to the card 92 via a connector 94 engageable with the connector 84 and by wires 96 extending between the connector 94 and the card 92. The SCSI connector 86 is electrically connected to the card 92 via a 50-position MOLEX connector 98 engageable with the connector 86 and by a flexible twisted-pair cable 100 extending between the connector 98 and the card 92. It is understood that for devices 26 having 68-position SCSI Wide connectors rather than the 50-position SCSI Fast connector 86, the connector 98 is replaced with a 68-position MOLEX connector and additional wires are added to the cable 100. Finally, the SCSI address terminal 88 is electrically connected to the card 92 via a SCSI interface 102 connected to the card 92 and by wires 104 extending between the terminal 88 and the interface 102.

The consolidation adapter assembly 90 further comprises an 80-position female edge connector 106 extending rearwardly through a rectangular slot 68b (see FIG. 1) formed in the back wall 68. The connector 106 is electrically connected via the card 92 to the power connector 84, the SCSI connector 86 and the SCSI address terminal 88 to provide a unitary connector for passing electrical signals between the device 26 and the assembly 10 for purposes described below.

Figure 5:
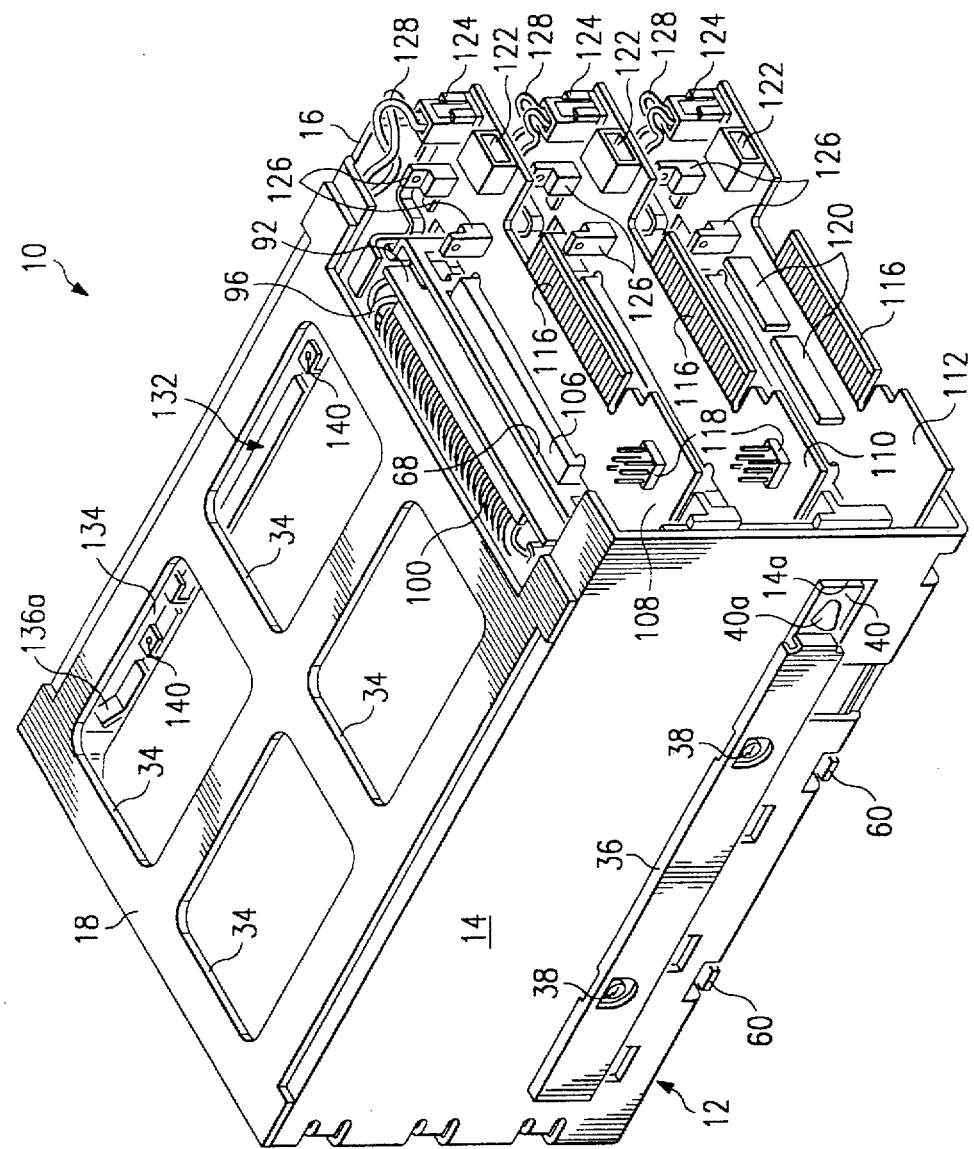
FIG. 5 is a rotated, perspective view of the invention shown in FIG. 1.

Referring to FIG. 5, the assembly 10 further comprises a plurality of horizontally disposed adapter cards 108, 110 and 112 screw mounted to and extending between the rearward ends of the sidewalls 14 and 16 of the housing 12. Each of the cards 108, 110 and 112 comprises a printed circuit board having an 80-position male edge connector 114 (see FIG. 1) extending inwardly into the chamber 22 for engagement with the edge connector 106 of the consolidation adapter assembly 90, and a 50-position male edge connector 116 extending outwardly from the chamber 22 for connecting the assembly 10 to the computer system (not shown) in which the assembly 10 is installed. As shown in FIG. 1, the edge connector 114 contains positions of varying lengths such that a set of positions, for example ground connections, designated by reference numeral 114a extends beyond the remaining positions for purposes described below.

Once installed in the housing 12, the devices 26 are interconnected via a SCSI daisy-chain cable as is known in the art. To ensure proper operation, each of the devices 26 is assigned a unique SCSI address between 0 and 7. In a preferred embodiment, SCSI address selection terminals 118 are disposed on the cards 108 and 110 for selecting the SCSI address for their respective devices 26. Selection of the respective SCSI addresses is accomplished by inserting jumpers (not shown) between two address pins in a conventional manner. It is understood that a rotary/digital dip switch (not shown) can also be employed for SCSI address selection. No SCSI address selection terminal is required for the card 112 because, as the last device 26 in the SCSI daisy-chain, its SCSI address is pre-configured at the factory to 7. In addition to assigning unique addresses to the devices 26 on the SCSI daisy-chain, a plurality of resistor packs 120 is used to terminate the last device 26 on the daisy-chain, namely the device 26 associated with the card 112.

A power connector 122 is disposed on each of the cards 108, 110 and 112 for passing power from the computer system (not shown) to the cards. This power, prior to being passed through the edge connectors 114 and 106, is routed through a microswitch terminal 124 and then a spike preventing power leveling circuit 126 disposed on each of the cards 108, 110 and 112. Each terminal 124 is connected via wires 128 to a respective microswitch 130 (see FIG. 7), which control the flow of power between corresponding pairs of power connectors 122 and power connectors 84 electrically connected to the respective disk controllers 80 (see FIG. 4).

Referring to FIGS. 1 and 6, a plurality of corresponding pairs of guide rails 132 extend horizontally along support plates 134 rigidly attached to and spaced from the interior surfaces of the sidewalls 14 and 16 of the housing 12, respectively, for receiving the flanges 74 and 76 of the trays 24 and aligning the connector 106 with the connector 114. As more clearly described in connection with FIG. 6, each of the guide rails 132 comprises an upper rail 136 and a lower rail 138 for receiving one of the flanges 74 or 76 therebetween, flange 76 being shown in phantom. Ends 136a and 138a of the upper and lower rails 136 and 138 facing the front entrance 32 of the housing 12 are angled outwardly from one another to facilitate the introduction of the trays 24 into the housing 12. In a preferred embodiment, the guide rails 132 are stamped out of the support plates 134 through conventional press forming operations, leaving openings 134a.

Spring clips 140 received within holes 136b in each of the upper rails 136 urge the flanges 74 and 76 downwardly toward the lower rails 138 to ensure proper alignment between the edge connectors 106 and 114 and to create a snug fit between the trays 24 and the housing 12. In addition, the spring clips 140 enable effective grounding of the devices 26 through the housing 12. In a preferred embodiment, two spring clips 140 are provided in each upper rail 136.

Referring now to FIG. 7, the assembly 10 further comprises a locking and actuating assembly 142 for each pair of guide rails 132. The assembly 142 governs the insertion and removal of the trays 24 into and out of the housing 12, as well as the passage of power to the devices 26 from the computer system (not shown). The assembly 142 is disposed within the housing 12 between the sidewall 16 and the support plate 134 and comprises the microswitch 130 and an actuating shaft 144. The microswitch 130 is screw mounted within a mounting harness 146 by screws 148, which screws 148 also secure the harness 146 to the sidewall 16. The microswitch 130 is electrically connected by the wires 128 to the microswitch terminal 124 disposed on each of the cards 108, 110 and 112, respectively, as previously described. The microswitch 130 includes an actuating trigger 150 movable between POWER ON and POWER OFF positions. A spring 152, preferably integral with the harness 146 and comprising a thin strip of metal formed into a curl, biases the trigger 150 downwardly into the POWER ON position. As the trigger 150 is moved upwardly against the spring 152, the microswitch 130 switches to POWER OFF. In a preferred embodiment, the microswitch 130 is of the type sold by Honeywell Corp. as P/N 311SM702-T. The shaft 144 is generally cylindrical with fins 144a extending along a portion thereof and comprises a manually engageable head 154 at one end having a slot 154a formed in the outermost end thereof, and a lever 156 engaging the underside of the trigger 150 at the other end. The trigger 150, being downwardly biased by the spring 152, biases the lever 156 downwardly, thereby imparting a counterclockwise torque on the shaft 144 as viewed from the head 154. Counterclockwise rotation of the shaft 144 is prevented, however, when the shaft 144 is in the position shown in FIG. 7 by a stop (not shown).

The shaft 144 extends horizontally th rough a generally oblong slot 158 formed in the arm 30 extending from the sidewall 16, leaving the head 154 exposed outside of the chamber 22. The end of the shaft 144 containing the lever 156 is secured within the housing 12 between a thin bracket 160 extending from the sidewall 16 that engages the bottom of the shaft 144 and a stop 162 extending inwardly from the harness 146 above the shaft 144. The bracket 160 and the stop 162 thereby prevent the shaft 144 from pivoting upward or downward, while still permitting the shaft 144 to rotate clockwise as viewed from the head 154 and to pivot side to side about the bracket 160.

The slot 158 is not perfectly oblong but is comprised of an oblong portion 158a disposed toward the sidewall 16 and an enlarged circular portion 158b disposed toward the finger 30a of the arm 30. The cylindrical head 154 of the shaft 144 is freely rotatable within the circular portion 158b, but the diameter of the head 154 is too large for freely entering the oblong portion 158a. However, diametrically opposed grooves 154b are cut into the shaft 144 for enabling the head 154 of the shaft 144 to freely enter the oblong portion 158a of the slot 158 once the shaft 144 is rotated to a particular alignment, preferably, a one-eighth clockwise turn.

A generally rectangular body 164 and a concave surface 164a extends from the shaft 144 just rearward of the arm 30 in the direction of the finger 30a. When the shaft 144 is in the position shown in FIG. 7, the body 164 is aligned with the guide rails 132 adjacent the sidewall 16 for purposes described below.

The assembly 10 is put into operation for enabling the rapid and reliable, removable connection of the devices 26 into the computer system (not shown), as follows. First, the housing 12 is secured within a compartment of the chassis 42, such as the compartment 44. To insert the housing 12, the guide rails 36 mounted to the exterior of the housing 12 are aligned with the channels 56 defined by the ridges 54 within the compartment 44. As the housing 12 is inserted into the compartment 44, the guide rails 36 slide within the channels 56. As the housing 12 is inserted further into the compartment 44, the cap 58 engages the protuberance 40a of the spring lock 40 and urges the protuberance 40a into the opening 14a of the sidewall 14. As the cap 58 travels past the protuberance 40a, the protuberance springs outward from the opening 14a and snap locks the cap 58 against one of the guide rails 36, thereby securing the housing 12 within the compartment 44. After installation, a SCSI daisy-chain cable (not shown) and power cables (not shown) are connected to the edge connectors 116 and the power connectors 122, respectively. Where more than one housing 12 is installed in the chassis 42, separate SCSI daisy-chain cables are connected to each set of edge connectors 116 to improve performance. The housing 12 is slidably removed from the compartment 44 by pushing the protuberance 40a into the opening 14a of the sidewall 14 to release the cap 58 and pulling on the housing 12 to slide it out of the compartment 44.

To secure the housing 12 within a compartment of the chassis 42 lacking the channels 56, the guide rails 36 are removed from the housing 12 by simply unscrewing the screws 38, and then engaging the mounting holes 60 disposed in the housing 12 with conventional locking mechanisms (not shown) once the housing 12 is inserted into the compartment. If properly dimensioned, the housing 12 can also be press fit into a compartment of the chassis 42 lacking channels 56.

Next, the devices 26 secured in the trays 24 are inserted into the housing 12. Referring to FIGS. 7 and 8A-8C, to insert the trays 24, the flanges 74 and 76 are aligned with the guide rails 132 within the housing 12 by resting the tapered rearward ends 74a and 76a of the flanges 74 and 76 on the guiding edges 28b and 30b of the arms 28 and 30, respectively. If the microswitch 130 is in its POWER ON position (the position shown in FIGS. 7 and 8A), the body 164 will be blocking the entrance to the guide rails 132 adjacent the sidewall 16 of the housing, thereby preventing installation of the tray 26. Therefore, the head 154 of the shaft 144 must be manually engaged and rotated clockwise, as represented by the arrow in FIG. 7, to rotate the body 164 away from the entrance to the guide rails 132. The shaft 144 can be rotated either by grasping the head 154 or by engaging the slot 154a with a screwdriver or similar device.

Figure 8A:
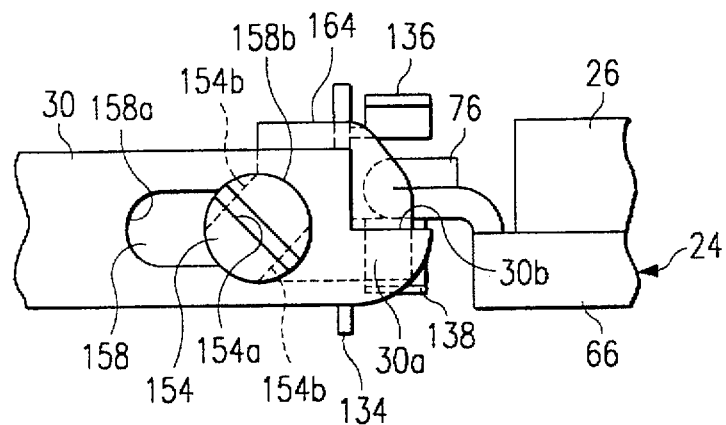
FIG. 8A is an enlarged elevational view of the shaft of the locking and actuating assembly in the locked position.
Figure 8B:
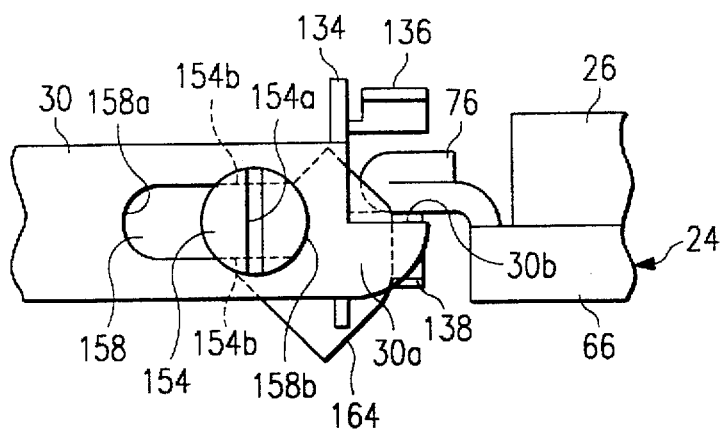
FIG. 8B is an enlarged elevational view of the shaft in the actuating position.
Figure 8C:
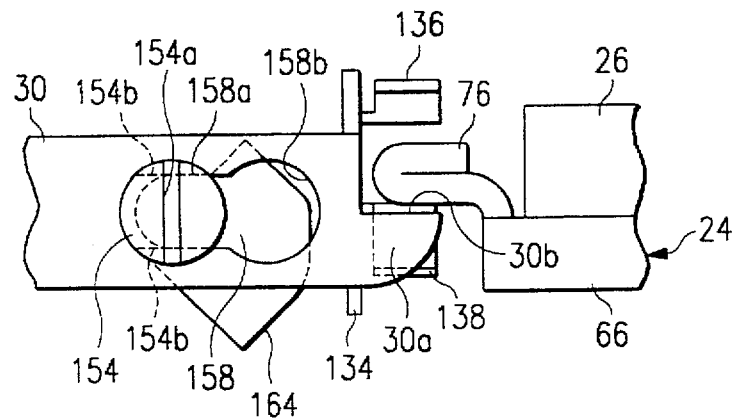
FIG. 8C is an enlarged elevational view of the shaft in the unlocked position.

As the shaft 144 is rotated clockwise an eighth of a turn to the position shown in FIG. 8B, the lever 156 pushes upwardly on the trigger 150 against the bias provided by the spring 162, moving the trigger 150 to switch the microswitch 130 to the POWER OFF position. The microswitch 130 thus causes a break in the power circuit at the microswitch terminal 124 on the card 108 (or the card 110 or 112) preventing power from reaching the edge connector 114, making it safe to install the device 26. It should be noted that the cards 108, 110 and 112, except for the edge connectors 114, remain energized while the microswitch 130 is in the POWER OFF position. In this position, however, the body 164 still partially blocks the entrance to the guide rails 132, but the grooves 154b are now aligned with the slot 158 enabling the shaft 144 to be pivoted sideways about bracket 160 to move the head 154 into the oblong portion 158a of the slot 158 to the position shown in FIG. 8C. In this position, the microswitch 130 remains in its POWER OFF position and the body 164 no longer blocks insertion of the tray 24 into the housing 12. Moreover, friction between the grooves 154b and the portion of the arm 30 defining the oblong portion 158a of the slot 158 keeps the shaft 144 in this POWER OFF position until the shaft 144 is again manually engaged.

The tray 24 is now inserted into the housing 12, and the flanges 74 and 76 slide within the guide rails 132. Insertion of the flanges 74 and 76 into the guide rails 132 is facilitated by the tapered rearward ends 74a and 76a of the flanges, as well as by the angled ends 136a and 138a of the guide rails. As the tray 24 is inserted, the spring clips 140 bias the flanges 74 and 76 downwardly against the lower rails 138, thereby properly aligning the edge connector 106 for mating with the edge connector 114 and grounding the tray 24 to the housing 12. As the tray 24 travels further into the housing 12, the extended positions 114a of the edge connector 114 first mate with the edge connector 106 to first establish ground before connecting other positions.

To power up the device 26, the head 154 of the shaft 144 is again engaged, first to pivot the shaft 144 about the bracket 160 to move the head 154 back into the circular portion 158b of the slot 158b, and second to rotate the shaft 144 counterclockwise to disengage the trigger 150 and switch the microswitch 130 to its POWER ON position. Upon activation of the microswitch 130, power flows from the power connector 122, through the power leveling circuit 126 to reduce any spikes or power surges, and through the edge connectors 114 and 106 to the power connector 84 on the device 26. After the edge connectors 114 and 106 are fully mated, the SCSI data and address signals are passed from the connector 116 and the terminal 118, respectively. The device 26 is then fully operational. It is understood that the operating system installed in the computer will at this time automatically recognize the existence of the newly inserted device 26 and begin its access of the devices 26 in a conventional manner.

The tray 24 is also easily removable. Note however, that with the shaft 144 back in the position shown in FIGS. 7 and 8A, the body 164 now acts to prevent removal of the tray 24 by blocking the flanges 76 while the device 26 is powered up. Thus to remove the tray 24, the shaft 144 must be rotated clockwise and pivoted as described above to power down the device 26 and slidably move the body 164 away from its blocking position. It is understood that the operating system installed in the computer will automatically recognize the nonexistence of the device 26 and stop accessing the device 26. Once the body 164 clears the path required for the removal of the tray 24, and the shaft 144 is locked into the oblong portion 158a of the slot 158, the tray 24 securing the device 26 is easily removed from the housing 12 by pulling on the flexible pull tab 78.

Several technical advantages result from the foregoing. Generally, the assembly 10 enables rapid and reliable replacement of data storage devices 26 from an assembly 10 containing multiple devices 26 without having to power down the computer system or file server. For example, by providing a single edge connector 106 that consolidates the power, SCSI data and control signals and SCSI address selection signals, there is no need to manually disconnect and connect the numerous connectors from the computer when replacing a device. Moreover, as the assembly 10 employs edge card connectors, such as the edge card connectors 106, 114 and 116, in lieu of pin and socket connectors, the force required to connect and disconnect the edge connectors is substantially reduced and the shorting and bending problems experienced with pin and socket connectors are avoided.

In addition, the assembly 10 ensures that each device 26 will have a unique SCSI address and hence no SCSI address conflict through the pre-assignment of a SCSI address to each device 26. Further, the assembly 10 ensures that the last device 26 in the SCSI daisy-chain is terminated as pre-termination of the SCSI daisy-chain is provided for.

Significantly, the assembly 10 contains the locking and actuating assembly 142 that prevents the devices 26 from being damaged by power spikes. The body 164 of the shaft 144 locks energized devices 26 within the housing 12, preventing them from being removed unless the microswitch 130 is activated to cut power to the device 26 first. Similarly, the body 164 prevents power from being applied to a device 26 unless it is fully inserted and looked in the housing 12. It is also understood that fault-tolerant software, such as R.A.I.D. (Redundant Arrays of Inexpensive Disks), can also be implemented in the present invention to allow reconstruction of data on the devices 26 removed to improve the availability and reliability of the devices 26.

It is also understood that the chassis 42 can contain numerous assemblies 10 with devices 26, each of which can be separately connected to different SCSI buses in the computer for lessening the workload of each computer bus. It is also understood that the performance of the computer is enhanced by conducting concurrent read and write operations to multiple devices instead of successive write and read operations to a single device.

It is also understood that variations may be made in the present invention without departing from the spirit and scope of the invention. For example, the body 164 extending from the shaft 144 can be reduced in size to convert the locking and actuating assembly 142 from a manual system to an automatic one. More specifically, the distal upper corner the body 164 can be cut off at a forty-five degree angle to provide, instead of a blocking surface, a surface that will rotate when engaged by the flange 76. Thus, when the body 164 is in its "blocking" position, the flange 76 will urge the body 164 to rotate clockwise due to the forty-five degree cut, thereby activating the trigger 150 to switch the microswitch 130 to its POWER OFF position. However, the flange 76 will not push the head 154 of the shaft 144 into the oblong portion 158a of the slot 158, so when the tray 24 is fully inserted into the housing 12, the spring 152 will urge the shaft 144 to rotate counterclockwise causing the microswitch 130 to switch back to its POWER ON position.

Further, it should be understood that the chassis 42 need not be part of a computer or file server chassis, as it could also be enclosed in an external housing with external SCSI centronics connectors and an independent power source. Moreover, it is understood that the assembly 10 of the present invention can also be implemented in the "non-hot plugging" mode.

Although illustrative embodiments of the present invention have been shown and described, a wide range of modification, change and substitution is intended in the foregoing disclosure, and in certain instances some features of the invention may be employed without a corresponding use of other features. Accordingly, it is appropriate that the appended claims be construed broadly and in a manner consistent with the scope of the invention.

What is claimed is:

1. A data storage device assembly connectable to a computer system, comprising:

a plurality of trays each having a small computer systems interface (SCSI) device and a first electrical connector mounted thereto, wherein said SCSI devices are connected together via a daisy chain connection, and one of said devices defines a last device in said daisy chain;

a plurality of adapter assemblies each corresponding to one of said trays for passing a plurality of signals between said device of said corresponding tray and said first electrical connector of said corresponding tray, said signals including power, SCSI data and control signals, and SCSI address selection signals;

a housing for removably receiving said trays;

means mounted to said housing for selecting a SCSI address for each of said devices;

means mounted to said housing for terminating said last device;

means for securing said trays within said housing;

a plurality of printed circuit boards mounted within said housing, one corresponding to each of said trays, each of said boards having a second electrical connector for connecting to one of said first electrical connectors and passing said signals between said first and second electrical connectors;

a switch electrically connected to said second electrical connector and electrically connectable to said computer system, said switch being operable, when connected to said computer system, in a first position for passing selected signals between said computer system and said second electrical connector, and in a second position for preventing passage of said selected signals between said computer system and said second electrical connector; and a plurality of keylessly operated locking and actuating assemblies mounted within said housing for preventing the removal of said trays out of said housing while said switch is in said first position.

said data storage device is a small computer systems interface (SCSI) device, the assembly further comprising means mounted to said receiving means for selecting an SCSI address for said data storage device.

2. The assembly of claim 1 further comprising:

a pair of horizontally extending guide rails mounted exteriorly to said housing; and a spring lock mounted to said housing rearwardly of one of said guide rails for removably securing said housing in a computer or file server chassis.

3. The assembly of claim 1 further comprising a flexible pull tab attached to each of said trays.

4. The assembly of claim 3 wherein said pull tab is a dielectric material.

5. The assembly of claim 1 wherein said securing means comprises:

flanges extending horizontally along opposite sides of each of said trays; and horizontally extending guide rails mounted within said housing for receiving said flanges.

6. The assembly of claim 5 wherein said securing means further comprises a plurality of spring clips for pressing each of said flanges against one of said guide rails.

7. The assembly of claim 1 wherein said first and second electrical connectors are edge connectors.

8. A data storage device assembly, comprising:

means for retaining a plurality of small computer systems interface (SCSI) devices, wherein said SCSI devices are connected together via a daisy chain connection, and one of said devices defines a last device in said daisy chain;

first electrical connection means mounted to said retaining means;

means for enabling passage of signals between said devices and said first electrical connection means;

a housing for removably receiving said retaining means;

means mounted to said housing for selecting a SCSI address for each of said devices;

means mounted to said housing for terminating said last device;

means for securing said retaining means within said housing;

second electrical connection means mounted to said housing and connectable to said first electrical connection means for transmitting and receiving signals to and from said first electrical connection means; and means for keylessly preventing said retaining means from being inserted into said housing while power is supplied to said second electrical connection means.

9. The assembly of claim 8 wherein said keylessly preventing means comprises:

means mounted to a sidewall of said retaining means for switching between power on and power off positions, said switching means being connected to a terminal disposed on said receiving means for receiving power therefrom;

means for biasing said switching means to said power on position; and an actuating shaft mounted to said receiving means and actuatable between first and second positions, said actuating shaft comprising:

means for preventing insertion of said retaining means into said receiving means while said actuating shaft is in said first position; and means for enabling insertion of said retaining means into said receiving means and for actuating said switching means to said power off position while said actuating shaft is in said second position.

10. The assembly of claim 8 further comprising:

a pair of guide means mounted exteriorly to said receiving means; and means mounted to said receiving means rearwardly of one of said guide means for removably securing said receiving means in a computer or file server chassis.

11. The assembly of claim 8 further comprising a flexible pull tab attached to each of said receiving means.

12. The assembly of claim 8 wherein said securing means comprises:

flanges extending horizontally along opposite sides of said retaining means; and horizontally extending guide rails mounted within said receiving means for receiving said flanges.

13. The assembly of claim 12 wherein said securing means further comprises a plurality of spring clips for pressing each of said flanges against one of said guide rails.

14. The assembly of claim 8 wherein said first and second electrical connection means are edge connectors.

15. The assembly of claim 1 wherein said plurality of locking and actuating assemblies are also operable for preventing the insertion of said trays into said housing while said switch is in said first position.

16. The assembly of claim 1 wherein said selected signals are power signals.

17. The assembly of claim 9 wherein said preventing means further prevents said retaining means from being removed from said housing while power is supplied to said second electrical connection means.

18. A data storage device assembly connectable to a computer system, comprising:

a plurality of trays each having a small computer systems interface (SCSI) device and a first electrical connector mounted thereto, wherein said SCSI devices are connected together via a daisy chain connection, and one of said devices defines a last device in said daisy chain;

a plurality of adapter assemblies each corresponding to one of said trays for passing a plurality of signals between said device of said corresponding tray and said first electrical connector of said corresponding tray, said signals including power, SCSI data and control signals, and SCSI address selection signals;

a housing for removably receiving said trays;

means for securing said trays within said housing;

a plurality of printed circuit boards mounted within said housing, one corresponding to each of said trays, each of said boards having:
- a second electrical connector for connecting to one of said first electrical connectors and passing said signals between said first and second electrical connectors;
- an address selection terminal for selecting the address of each of said devices; and
- a plurality of resistor packs for terminating said last device;

a switch electrically connected to said second electrical connector and electrically connectable to said computer system, said switch being operable, when connected to said computer system, in a first position for passing selected signals between said computer system and said second electrical connector, and in a second position for preventing passage of said selected signals between said computer system and said second electrical connector; and a plurality of keylessly operated locking and actuating assemblies mounted within said housing for preventing the removal of said trays out of said housing while said switch is in said first position.

19. A data storage device assembly, comprising:

means for retaining a plurality of data storage devices, wherein said devices are connected together via a daisy chain connection and one of said devices defines a last device in said daisy chain;

first electrical connection means mounted to said retaining means;

means for enabling passage of signals between said devices and said first electrical connection means;

a housing for removably receiving said retaining means;

a printed circuit board mounted to said housing, said printed circuit board having an address selection terminal for selecting an address for each of said devices;

a plurality of resistor packs mounted to said printed circuit board for terminating said last device;

second electrical connection means mounted to said housing and connectable to said first electrical connection means for transmitting and receiving signals to and from said first electrical connection means;

means for keylessly preventing said retaining means from being inserted into said housing while power is supplied to said second electrical connection means;

means mounted to a sidewall of said retaining means for switching between power on and power off positions, said switching means being connected to a terminal disposed on said receiving means for receiving power therefrom;

means for biasing said switching means to said power on position; and an actuating shaft mounted to said receiving means and actuatable between first and second positions, said actuating shaft comprising:
- means for preventing insertion of said retaining means into said receiving means while said actuating shaft is in said first position; and
- means for enabling insertion of said retaining means into said receiving means and for actuating said switching means to said power off position while said actuating shaft is in said second position.

* * * * *